Patented Aug. 5, 1941

2,251,334

UNITED STATES PATENT OFFICE 2,251,334

PROTEIN COMPOSITION OF MATTER

Lloyd A. Hall, Chicago, Ill., assignor to The Griffith Laboratories, Inc., Chicago, Ill., a corporation of Illinois No Drawing. Application February 6, 1939, Serial No. 254,808

23 Claims. (Cl. 260—112)

The present invention relates to protein products particularly valuable as food or medicinal ingredients. They are new molecular species developed as the result of a chemical complexing between the proteins of milk or milk by-products and blood. The principal proteins involved in the reaction complex are commonly known as hemoglobin in blood and casein and/or lactalbumen of milk or whey. These proteins are used as food, and as food and medicinal ingredients.

One object of the invention is to provide an improved agent for the treatment of anemia whereby hemoglobin in complex combination with other desirable proteins may be administered to restore the desired normal conditions and thus to provide the proper balance of red blood cells to white blood cells and to maintain important food constituents for this balance.

Another object of the invention is to prepare products combining values from milk proteins and blood proteins.

A further object of the invention is to provide a highly nutritious material in a stable, palatable form for use as food or medicine, and for use in certain types of bacteriological media.

A further object of the invention is to provide an improved absorbent binder and moisture-imbibition agent for retaining the moisture content of sausage and other ground meat products during smoking, curing, or storing, thus providing a substitute for cereal products so used.

Various other and ancillary objects and advantages will be apparent from the following description.

Blood is often prescribed in anemia. In its usual form it has a bad taste and odor, and a bad psychological effect on the patient which may well offset the good which its consumption should produce. The products of my invention, as made according to my preferred examples herein given, appear much like malted milk. Salt, malt, cocoa, chocolate or vanilla or other desirable flavors or condiments may be added if desired or introduced in the process of manufacture. Such a product may be consumed a tablespoonful, more or less, in a glass of warm water or milk as a palatable food of exceptional medicinal value. The combined proteins are in an especially assimilable form.

In the treatment of anemia, among many preparations which have been used is defibrinated blood, but the use of this material is decidedly disadvantageous because the process of defibrination introduces possibilities of infection, and further, defibrinated blood of the best quality is unstable and therefore cannot be kept pure for any length of time. Blood transfusion is also used in anemia, but this method of treatment is also unsatisfactory. Cholesterin is used in the treatment of anemia, particularly pernicious anemia, but since this material is expensive to obtain in a purified form, it is usually given in the form of milk or eggs.

The basic requirement for treating anemia is iron, but it must be in an assimilable form and this is desirably an organic form. Hemoglobin is a protein complex having 4% iron, and is accepted as an excellent medicinal source of iron for anemia. There are several types of anemia that occur, the etiology of which is not known. Pernicious anemia falls in this category. Nutritional anemia is often seen in childhood. The indicated treatment is frequently by giving blood-building substances by mouth and hyperdermically, plus fresh air and sunshine. The product of my invention combines the suggested treatment of cholesterin with large quantities of hemoglobin in stable chemical combination.

Cholesterin is present in the fat of milk or whey, in relatively small quantity occurring probably in the form of phospholipids. The range of phospholipids in skim milk or whey is from 0.0015% to 0.15%. This small amount seems to have a definite function, although this function is not clearly understood. The amount of chloesterin in skim milk and whey is dependent upon the processing from raw milk.

In the classifications of proteins, blood is considered as a conjugated protein in the chromoprotein series. As a conjugated protein, it is a simple protein termed globin, combined with a material from the prosthetic group, namely a chromoprotein, termed hematin, the latter being the color producing part of hemoglobin. The casein of milk is termed a phosphoprotein, making the protein complex. This again is a simple protein combined with phosphoric acid as the prosthetic group.

These proteins or protein complexes have measurable combining powers, for both acidic and basic substances and because of this dual nature are called amphoteric. It is known that the combining powers vary with change in the material with which the combination is made and with conditions such as the hydrogen ion concentration (pH) of the medium, the character of the medium, the concentration of material, the temperature, and added inorganic or organic chemicals, and other factors.

The classical chemical experiments of eminent authorities in biochemistry have demonstrated that protein molecules involve many-membered peptide chains. It has been pointed out that such polypeptide chains allow an overwhelming number of different structures when one varies the number, the nature and the order of the constituent units. These observations appear to offer an explanation for the vast number of different proteins found in nature, but on the other hand, with this variety of structure there is at present no known way of determining the exact structure of a single high-molecular-weight protein. However, recent investigations have indicated that progress is being made in this direction, and it has been found that the natural proteins are not simply polypeptide chains of every conceivable length and configuration. For example, in beef hemoglobin, one of the reactants of my new product, it is known that the molecule is composed of 576 or $2^6 \times 3^2$ amino acid residues and of this total there are twelve arginine residues, 32 histidine residues, 36 lysine residues, and other residues.

It is known that anzymes like pepsin, trypsin, papain, pancreatin, and others have the property in natural and man-made processes of breaking down gigantic protein molecules to simpler protein molecules. However, in nature there is some process of reversal whereby simpler proteins are made to combine to produce the gigantic protein molecules. Very little is known about how nature does this. The present invention provides a process whereby this may be done with the proteins herein referred to. As the protein molecule is assembled from hundreds or thousands of amino acids according to what now appears to be a well-defined plan, there appears to be no other choice than to assume that the synthesis of each of these gigantic molecules is perhaps controlled by a specific chemical catalyst, or assembler, or conditions for assembly.

By the present invention, the combining powers of milk protein, and of hemoglobin are used to satisfy each other to such a degree that a chemical combination or union of the two is effected. Because of the variability of the combining power of protein, the ratio of the combined proteins in the new product may vary to a considerable extent. As a result the new product may be present with either an excess of uncombined milk protein and other milk products, or an excess of uncombined hemoglobin and other blood products depending upon the quantities and kind of raw material originally employed, and upon conditions imposed by and upon the medium in which the combination occurs.

There is no subject of greater immediate interest in the field of biochemistry than the combination of two or more proteins into new complex molecules. It is almost certain that in living cells protoplasm is constituted of complexes of simpler proteins, but there is no direct proof from chemical analysis or other known chemical methods. Two or more proteins, particularly together in solution, might be expected to act in one of the following ways:

1. Form a physical mixture in an unchanged form.
2. Form a physical mixture in a denatured form.
3. Precipitate each other as a mixture.
4. One absorb the other superficially.
5. One protein precipitate preferentially (as is the case in beer proteins).
6. Form a new complex with new and permanent properties.
7. Form a loose complex of more or less reversible type in equilibrium with the original simpler molecules.

About 1919 a new method of chemical analysis by means of X-ray diffraction was described. The experimental procedure pointed out the various interesting and important features of the method, emphasizing the experimental simplicity of obtaining the diffraction pattern of a substance and the fact that it requires only a minute amount of material. It was definitely stated that this method tells the state of chemical combination of the elements present in the unknown. The basis of this new method (Jr. Ind. & Eng. Chem. Anal. Ed., vol. 10, page 457 of 1938) was given as follows:

"That every crystalline substance gives a pattern; that the same substance always gives the same pattern; and that in a mixture of substances, each produces its pattern independently of the other, so that the photograph obtained with a mixture is the superimposed sum of photographs that would be obtained by exposing each of the components separately for the same length of time. This law applies quantitatively to the intensities of the lines (provided absorption is negligible for each of the components) as well as to their positions, so that the method is capable of development as a quantitative analysis." (A. W. Hull, Jr., Am. Chem. Soc., vol. 1, page 1168 of 1919.)

The product of my invention herein described has been analyzed by X-ray diffraction methods as well as by other chemical and physical methods. These X-ray diffraction methods give incontrovertible proof relative to the formation of these new protein complexes.

Chemical analysis of my new product indicates very definitely the highly nutritious character of the material. In nutrition, the relation of the amino acids to growth has been the subject of numerous investigations during the past thirty years. Until comparatively recently, however, only three of these compounds, namely, tryptophane, lysine and histidine, had been shown definitely to be indispensable components of protein foods. Authoritative evidence has appeared in recent years to demonstrate the essential nature of cystine, while certain other protein components, notably the dibasic amino acids and the prolines, seem now to be indispensable.

It soon became apparent that the known amino acids, when incorporated in otherwise adequate diets, were incapable of supporting growth, and it was evident that prolines supply something which was not present in the amino acids. This work led to work by Rose and associates (Jr. Biol. Chem., 112; 283, 1935–36) to the isolation and identification of a new indispensable constituent, namely, a-amino-B-hydroxy-n-butyric acid. This compound is widely distributed in nature, but appears in greatest abundance in the blood proteins.

It has been further determined that the ten amino acids now considered essential for growth are mostly present in blood protein, or hemoglobin, one of the materials used in the development of the protein complex of my invention.

Plants build the simple inorganic nitrogen (from ammonia and nitrates) into plant proteins of various complexity. Animals and man consume these proteins. Animal and human digestion breaks complex proteins into their simpler protein components to supply protein building blocks. The blood stream carries these blocks and the animal system builds up the complex proteins required. Hence animal protein is a selected source of proper building blocks for animal and human needs. Many industrial operations on protein break them up, and may break up such building blocks as well as break down combinations into such building blocks. The present process is unique in combining complexes into higher complexes so that each loses its identity. Thus, the protein building blocks inherent in animal milk and in animal blood may be provided without the necessity of breaking down blood, and without the direct use of blood.

Storage over a period of more than a year indicates that the products of this invention have a high degree of stability, as to composition and purity.

Hemoglobin has been used to excellent advantage as an enrichment of culture media, chiefly for organisms of the pneumococcus group and for the hemophilic bacteria (H. bacteria). The preparation of the hemoglobin solution, however, is an involved and time consuming procedure with many attendant problems, which make the preparation of these media extremely difficult and frequently very unsatisfactory. Hemoglobin, however, in bacteriological procedures is well suited to the growth of H. influenzae, pneumococci, and streptococci. Further, the addition of blood imparts to culture media certain growth-promoting qualities which are very desirable for some organisms. As a means of detecting the ability to produce hemolysis, fresh blood media are necessary. It is indicated that my new product is satisfactory for these bacteriological purposes, thus dispensing with the use of fresh blood.

In the manufacture of sausage and other ground meat products, it has been the custom to add cereals such as corn flour, potato starch, tapioca flour, and more recently soya bean flour, to increase the water holding power of the product, thus to avoid shrinkage. Where starchy products are used, the swelling of the starch cells provides the desired property, but the use of starch dilutes the protein content of the meat product, and its addition is therefore undesirable.

To overcome these disadvantages the trade has more recently used soya bean flour. This is a high protein product and when raw it has high water-holding capacity. However, when added to meat and after smoking, heating or cooking this property deteriorates and the soya bean treated meat products show considerable shrinkage.

By means of the present invention I have produced a product which is high in protein, which is protein of animal origin, which is particularly efficient and stable in water absorbing and holding capacity when added to meat, even after heating, smoking or cooking. The new product when added to meat, combines the advantages of both cereals and the soya bean flour, without the disadvantages of either one.

The invention may be carried out in numerous ways, but the preferred manner is as follows:

Fresh blood is collected from edible animals under sanitary conditions and immediately treated to prevent coagulation. This may be done for a food product by adding from 0.30% to 0.70% (by weight) of sodium citrate. Although sodium chloride is present in blood, there is not enough to preserve it; thus 1.25% to 3.00% sodium chloride may be added for preservation purposes. The added quantity preserves it as a liquid and retards bacterial spoilage for several days, so that it may be used for the present invention. The presence of such salt adds to the palatability of the product used in a beverage. Beef blood is preferred, as it contains from 18% to 21% of solids. Its pH is about 7.3 to 7.65. Since the invention is concerned with the hemoglobin of blood and not essentially with the fibrinogen, which is a normal constituent of blood, it is to be understood that hemoglobin may be prepared from raw blood apart from the fibrinogen. Any well known method may be used to remove the fibrinogen. However, the fresh blood (with all its blood solids) is preferred. Other known methods of preventing coagulation may be employed when the fibrinogen content is retained. For example, from 0.4% to 0.6% concentrated phosphoric acid may be added or from 0.4% to 0.75% concentrated lactic acid may be used, based on the weight of the blood. The phosphate salts also can serve such purposes. These are ingredients entering into products edible in nature, and therefore permissible for food and medicinal purposes.

Whole milk can be used, although fresh skim milk is preferred as a source of milk protein although whey (preferably cheese whey) may be used. Skim milk contains about 8% to 10% of total solids, of which 3% to 4% is casein, there being in addition 4.5% to 5.5% of lactose, 0.2% to 0.3% lactic acid, less than 1% of lactalbumen, and some mineral salts. Casein has carboxyl groups which contribute the acid property of casein. These are readily made free carboxyl groups by acidification.

Whey is the product remaining after the removal of most of the casein and fat from milk in the process of cheese-making, in butter-making, casein production and other treatments. Whey varies considerably in composition depending, of course, on the composition of the original milk, and the process producing it. Whey contains most of the salts, lactose and lactalbumen of the milk, and in addition nitrogen compounds containing traces of casein and a little butter fat. Storage of whey for any considerable time results in a decrease in the percentage of lactose, and increase in the acidity, and break-down of the nitrogen compounds. The approximate analysis of separated fat-free cheese whey, is as follows:

|  | Fresh whey | Dried whey powder |
|---|---|---|
|  | Percent | Percent |
| Lactose | 4.9 | 73.5 |
| Ash | 0.6 | 9.0 |
| Protein (largely lactalbumen and globulin) | 0.9 | 13.5 |
| Water | 93.6 | 4.0 |
|  | 100.0 | 100.0 |

The lactose content is readily convertible by fermentation in whole or in part to lactic acid. The acidity of whey has a pH of about 4.3 to 5.4. The acid present in whey may be lactic acid formed by natural fermentation, or it may be a foreign acid such as, for example, hydrochloric acid introduced for the purpose of separating the casein from milk or for other purposes. Whey is relatively high in vitamin $B_2$ (vitamin G), and it has been found that it is of considerable nutritious value in growth. The vitamin $B_2$ (lactoflavin) content more or less parallels the lactalbumen content, which may vary generally from 0.1% to 0.75%. About 0.1% casein is found in whey.

In order to carry out the invention in a practical way for large scale production, it is desirable to keep the proteins in workable fluid colloidal suspension in the liquid being handled. The blood may be acidified without precipitating the protein, but as the pH goes down it thickens. The milk casein is readily precipitated or curdled by too high an acid concentration. I have found that both the milk and the blood must be at a pH of not over 6 in order to secure chemical combination, but each may be lower, so long as the casein does not precipitate in the pH adjustment, or upon adding the adjusted blood. I prefer therefore to adjust the milk to a non-curdling acidity at or below pH 6, and then to adjust the blood to the same pH, in order to be certain that upon mixing the proteins the casein is not precipitated. I have found the practical safe range to be from pH of 5.4 to pH of 6, and that the preferred and greater chemical combination is indicated on a more limited range of pH 5.70 to 5.75. In order further to have assurance against curdling I use the same acid to adjust the milk protein and the blood protein. This is not essential however, since I have obtained combination by adjusting milk to one pH with one acid, and adjusting blood to another pH with a different acid. Edible acids or acids making edible salts are preferred, such as hydrochloric, phosphoric, tartaric, citric, lactic, and any acid salts of these.

However, adjustment with acid is not an essential. I have adjusted the pH of whey by adding alkali to raise the pH. It is the knowledge or control of the pH that is important rather than the means to attain it. For fresh milk, the adjustment is ordinarily made with acid. But milk which is not fresh may have a pH from normal fresh milk down to near pH 4.3, the isoelectric point of casein. I prefer to keep well above this pH for the milk and for the blood, because concentration of the liquids may reduce the pH to a precipitating point. For convenience in handling, blood may be at a lower pH than is permitted for milk, but the precautions desired in regard to milk do in a practical way set limits for blood or hemoglobin which are not imposed by the specific character of the blood protein. Blood can be adjusted to a pH of 4.00 without effecting precipitation. Since casein precipitates at pH of 4.3, this practically sets the lower limit for the blood protein. Hence both should be above pH of 4.3.

For determining the presence of the chemical combination I have been limited to the use of X-ray analysis, which is effective only on the dry solid compound. Hence, I do not know whether the combination is effected immediately upon mixing the proteins, or upon heating the mixture, or upon dewatering the mixture. However, it exists, and is evidenced by the dry solid form. This is obtained by a dewatering process, as by spray drying or roll drying for large scale production, or evaporation in pans, dishes or stills for small scale procedures. The residual moisture in the product may vary over a wide range, depending upon the operation of the process, and may be as high as 5% to 6%, but normally runs about 4½%.

In order to facilitate speed of the commercial processes in spray drying and roll drying, total solids of 45% to 50% is preferred. Hence I prefer to concentrate the milk first, then add the blood, then concentrate the mixture, and dry; or mix the adjusted blood and milk without prior concentration, concentrate, and dry. In practice, I have used the procedure commonly employed for concentrating milk, in vacuum concentraters, using a temperature up to 150° F., but preferably 130° F. to 135° F. Where the adjusted milk is first concentrated the solids may be increased from the original 8% to 10% to 20% to 50%. It is noted particularly that where the milk is adjusted before concentration (not necessary but highly practical), the concentration will increase the acidity. Therefore, the original pH for adjustment is chosen so that such increase does not effect precipitation of the casein. The iso-electric or precipitating point for casein is about pH of 4.3, and this practically sets the lower limit for the process.

The heating and drying, as practically accomplished, may follow the known process for the vacuum drying of liquids to solids. This may involve drying on vacuum heated rolls or spray drying with pre-heating of the liquid. The pre-heating may involve concentration, as in vacuum pans, to increase total solids. In using roll dryers the liquid may be pre-heated before heating the rolls or may be pre-heated in the trough formed by two associated rolls. Pre-heating in coils may also be practiced. Reaction may take place entirely or partially in pre-heating and may be completed in drying. The combination with reactive groups of proteins is much or less loose, with the degree of combination changing with the variation in water content, for example, as drying occurs. This combination may involve several points and types of combination. In addition to firm chemical bonds, loose chemical bonds and adsorption effects may eventually be found to exist and are indicated by known properties and reactions of proteins. Therefore, the isolated dried product may differ from the unisolated product formed in water.

*Example 1*

One means of carrying out the invention may be as follows: 25,200 lbs. skim milk is concentrated to about 47% solids. Into this concentrated milk I add 20 gallons of a water solution in which 18 lbs. of citric acid has been dissolved. This mixture is drawn into a vacuum pan through a preheater. The acid solution is then completely washed out of the system by the addition of 10 gallons of water. The addition of the acid to the concentrated milk gave the milk a pH of 5.7. 441 gallons of edible beef blood, previously adjusted to pH of 5.7, is then added to the adjusted concentrated milk in the vacuum pan. The batch is further cooked or concentrated an additional fifteen minutes after the blood is added, the final solids being approximately 45% when the contents are withdrawn and sent to a spray dryer. The material dries readily and when taken out of the spray dryer has a reddish-brown color.

In this example the finished product contains about 4.00% blood solids, of which the hemoglobin content is in the combined protein complex. It contains .5% to 2.00% moisture; about 48% to 50% lactose; 6% to 8% inorganic salts and 38% to 40% protein, containing the reaction product. The finished product, as taken from the dryer, is practically odorless, lacking the animal odor of dried blood and lacking the "lactic" or sour odor of dried milk. It is stable and non-hygroscopic. The sodium chloride content acts as a preservative for the solid material. In a 10% suspension in water it has a pH of about 6.6.

The product has a property of being changed in color by the presence of nitrous acid, as derived from nitrite or nitrate. Consequently when the composition is used in meat products, containing one of these materials for the normal purpose of curing the meat, the new product changes the color to a bright red, which improves the appearance of the meat product. The product is therefore like meat in these respects—that it presents combining power for nitrous acid to produce a change in coloration and that it has an animal origin and high protein content.

It is believed that under the conditions of heat (or heat and drying) the sodium chloride or other of the inorganic constituents may react with the casein or part of the combined casein or some other amphoteric ingredient. This is evidenced by the change in pH from the normal of about 6.6 to 6.8, which is a slightly acid condition. The phosphoric acid in casein probably enters into reaction, forming some sodium phosphate salt as a buffer agent on the acid side. This probably remains, as evidenced by the pH of the product dissolved in water.

Since there are a variety of components, other than protein, in both blood and milk, it is to be understood that there may be other reactions occurring with products present, which influences the ratio in which the proteins may combine. It is therefore to be understood that the product of this invention may exhibit excess blood protein or excess milk protein or other kinds of products combining these proteins, depending in part upon the proportion of blood and milk used. It is therefore seen that the ratio disclosed is not critical.

For commercial uses in the meat field compositions are useful which contain the equivalency of from 2% to 5% blood solids or the hemoglobin thereof. Where 50% by weight of blood solids is present, and blood and skim milk are used, the original mixture will require about two volumes of milk to one volume of blood. However, the invention is not to be considered as limited.

Example 2

8 fluid oz. skim milk is adjusted to pH of 5.6 with citric acid. 1.5% by weight of sodium chloride is added to 1.25 fluid oz. of edible beef blood containing 0.35% sodium citrate and then also adjusted to pH of 5.6 with citric acid. The adjusted milk and blood are mixed thoroughly and concentrated to dryness in vacuo. The material is then powdered.

Example 3

8 fluid oz. skim milk is adjusted to pH of 5.5 with citric acid. The milk is concentrated to 25% of its original volume in vacuo (in other words, 75% distillate is collected). The blood containing 1.5% sodium chloride is adjusted to a pH of 5.5 with citric acid and then thoroughly mixed with the concentrated milk and taken to dryness in vacuo. The material is then powdered.

Example 4

Lactic acid was added to the skim milk until the titratable acidity was 0.3% as lactic acid. It was found that the addition of the above amount of lactic acid gave to the milk a pH value of 5.5. The milk was then concentrated in vacuo until 50% distillate was obtained. Blood containing 0.35% sodium citrates and 1.5% sodium chloride was adjusted to pH of 5.5 with lactic acid and then thoroughly mixed with the concentrated milk and mixture taken to dryness in vacuo. The material is then powdered.

Example 5

Adjust skim milk to pH of 5.75 with tartaric acid. Then put in a vacuum still and concentrate until 70% distillate is obtained. Edible defibrinated beef blood, containing sodium citrate as an anti-coagulant, is adjusted to a pH of 5.75 with tartaric acid and then thoroughly mixed with the concentrated milk and the product taken to dryness in vacuo. When dried the product was ground to a fine powder as usual.

Example 6

5,000 lbs. skim milk adjusted to a pH of 5.7 with concentrated phosphoric acid is concentrated in vacuum evaporator to about 45% solids. 600 lbs. of the separated hemoglobin fraction of edible beef blood was adjusted to a pH of 5.7 with phosphoric acid and added to the concentrated milk. The mixture is agitated and further concentrated for about fifteen minutes. The mixture is then pumped to a spray-drying apparatus.

Example 7

5,000 lbs. of skim milk is adjusted to a pH of 5.75 with citric acid and concentrated to about 45% solids. The separated hemoglobin fraction from edible beef blood is adjusted to a pH of 5.75 and thoroughly mixed with the concentrated skim milk in the evaporator, then agitated and further concentrated for fifteen minutes and pumped to the spray-drying apparatus.

Example 8

15,000 lbs. of edible American cheese whey was found to have a pH of 5.4 so that no adjustment was necessary. Since the acidity of the whey was due to the lactic acid it contains, 1200 lbs. of the separated hemoglobin fraction of edible beef blood was adjusted to a pH of 5.4 with concentrated lactic acid. The adjusted hemoglobin was then added to the concentrated whey in vacuum evaporator and the mixture was further mixed and concentrated for about twenty-five minutes after which the material was pumped to the spray-drying apparatus.

Example 9

15,000 lbs. of edible American cheese whey was concentrated to about 35% solids; 3,360 lbs. of edible defibrinated beef blood, containing about 0.35% sodium citrate as an anti-coagulant, and 1.25% sodium chloride was adjusted to a pH of 5.4 with concentrated lactic acid. The mixture was further concentrated in vacuum evaporator for about thirty minutes and then the concentrated protein complex was pumped to the spray-drying apparatus.

Example 10

10,000 lbs. of skim milk, adjusted to pH of 5.6 with citric acid, was concentrated to about 45% solids. Edible beef blood, containing about 0.35% sodium citrate as an anti-coagulant, and 1.5 sodium chloride was adjusted to a pH of 5.6 with citric acid. The adjusted blood was then added to the concentrated skim milk in the evaporator and further mixed and concentrated for about fifteen minutes, after which it was pumped to the spray-drying apparatus.

Example 11

The milk sugar was first precipitated from the whey by a commercially known method involving use of ethyl alcohol and of this delactosed whey, 15,000 lbs. had a pH value of about 5.5. To this was added the separated hemoglobin fraction of edible beef blood, which had previously been adjusted to a pH of 5.5 with lactic acid. The product was thoroughly mxed and concentrated in vacuo to about 45% solids and then was pumped to the spraying apparatus.

Example 12

8 fluid oz. of skim milk was adjusted to a pH of 5.9 with tartaric acid. It was concentrated in vacuo until 20% of distillate had been collected. High test calcium hypochlorite (containing approximately 70% available chlorine) was then added in amount of 0.067 gm. The concentration was continued until 66% of the original volume of milk had been collected in form of distillate. Another portion of 0.067 gm. of high test calcium hypochlorite was added and the concentration was continued until 75% of the original volume of milk in form of distillate had been collected. The total amount of high test calcium hypochlorite added was 0.134 gm., which was about 625 parts per million available chlorine. To this concentrated milk was added 1.25 oz. fresh defibrinated edible beef blood, containing 0.35% sodium citrate and 1.25% sodium chloride, the blood having been first adjusted to pH of 6.0 with citric acid. The mixed material was then evaporated to dryness in vacuo and the dried product powdered as usual. The final product did not contain any traces of chlorine and had a bacterial count of 200 per gm., and no mold was present. The taste and odor of the sample was the same as previous examples. The solubility of the product and other normal characteristics were not effected. The hypochlorite is used here for its sterilizing action.

Example 13

Skim milk is adjusted to a pH of 5.9 with citric acid, and concentrated to about 80% of original volume. To each 8 fluid ounces of original milk is then added about 0.067 gram of high test calcium hypochlorite (70% available chlorine). Concentration is continued to about 25% of original volume of skim milk. Then a second and equal quantity of the calcium hypochlorite is added. For every 8 fluid ounces of original skim milk is added 1.25 fluid ounces of fresh defibrinated blood as in Example 12, but adjusted to pH of 5.7 with malic acid.

Example 14

Following closely Example 8, cheese whey of pH of 5.3 is treated with sodium bicarbonate to raise the pH to 5.7. Calcium hypochlorite is added as to milk in Example 12, during concentration. The pH rises due to the concentration to 5.8. Citrated blood containing 3% sodium chloride is adjusted to pH of 6.0 with citric acid, and mixed with the concentrated whey in the proportion of about 1200 pounds of blood to 15,000 lbs. of original whey. The mixture is dried.

In the above examples, the blood solids in the finished product were approximately as follows:

| | Per cent |
|---|---|
| Example 1 | 4 |
| Example 2 | 4 |
| Example 3 | 4 |
| Example 4 | 4 |
| Example 5 | 4 |
| Example 6 | 30 |
| Example 7 | 50 |
| Example 8 | 30 |
| Example 9 | 50 |
| Example 10 | 34 |
| Example 11 | 30 |
| Example 12 | 4 |
| Example 13 | 4 |
| Example 14 | 30 |

All the protein complexes of the examples herein given show very definitely, by X-ray diffraction patterns, the proof that chemical reaction has occurred and that a new and probably larger molecule has been formed.

The technique employed in the examination of these chemical (milk-protein-hemoglobin) combinations is familiar. Radiation from a copper target X-ray tube, after suitable collimation by means of 0.025 inch pin holes, passed through the powdered sample and registered the pattern on a flat film 5 cm. behind the specimen. The most distinctive feature shown by the X-ray diffraction patterns of such a complex as is formed by this invention is an inner ring, 1 cm. in diameter, corresponding to a spacing somewhere in the molecule of 15.4 A. U. (Angstrom units). The true spacing may be a multiple of this, since rings for low orders of very small diameters may not be resolved. This ring is a new characteristic of the complex, and is not formed by blood hemoglobin alone, or by milk protein alone. This ring is common to the complex produced in the cases of both whey and casein, but some variations in the patterns are also found.

Innumerable experiments have indicated that the pH is important in this chemical complexing, for experiments made on the raw materials without pH adjustments in no instance showed chemical combination of the proteins, said described ring being absent. Calcium hypochlorite, sodium chloride and other inorganic salts did not have any effect on the protein complexing.

The X-ray diffraction pattern shows in varying intensity the 1 cm. ring corresponding to a characteristic spacing of 15 A. U. This is the most direct evidence of the formation of the casein-hemoglobin complex. This diffraction ring varies in intensity on different samples. All the samples which show proof of the chemical complexing have a small inner ring and in addition typical broad halos. Of course other patterns are present which are due to the crystalline salts in the product, such as sodium chloride, sodium citrate, etc.

The patterns are very definite and unmistakably show the protein complexing. Of course, it was necessary to run controls on all of the materials that were used in the formation of these chemical combinations, such as dried beef hemoglobin, dried whey, dried blood, dried milk, sodium chloride, sodium citrate, etc. The finding of the typical diffraction rings of small diameter always definitely identified the chemical complexing and as has been said, these rings have an average diameter of about 1 cm. together with the halos typical of the new complex for the set conditions employed.

In further explanation of the definiteness of X-ray in the conclusive analysis of structures, it was discovered in 1912 that crystals are tridimensional diffraction gratings for X-rays by virtue of the regular arrangement of the atoms and molecules upon lattice planes with spacings commensurate with X-ray wave-lengths. In a comparatively short space of time hundreds of chemical compounds, inorganic and organic, metals, alloys, colloids and materials of every imaginable variety have been subjected to X-ray diffraction analysis, with the result that valuable information has been obtained upon what may be termed nature's building plan. An important extension of the diffraction technique is the study of the great range of complex, highly polymerized materials which are formed in living processes. They were found to have a sufficiently well ordered arrangement of their molecules to give characteristic diffraction patterns.

It has been definitely demonstrated that a simple relationship governed the diffraction phenomenon and connected X-ray wave-length, crystal interplanar spacing and the angle of incidence of the rays. This relation, the Bragg law, is as follows $n\lambda = 2d \sin \theta$ where $\lambda$ is the X-ray wave-length, $d$ the spacing of a set of parallel planes in a crystalline substance, $\theta$ the angle of incidence of a pencil of rays (or $2\theta$ the angle of diffraction), and $n$ an integer, the order of reflection. When the wave-length is known, the distance $d$ between the planes in the crystal can be obtained by an evaluation of the angle $\theta$ or, what is equivalent, from a measurement of the diameter of the rings in the diffraction pattern.

This new protein complex, prepared in accordance with the present invention, has a distinctive and identifiable structure as is clearly indicated by its X-ray diffraction pattern. The compounds prepared in accordance with present invention, when subjected to crystal analysis by X-ray diffraction, preferably by the powder method, display a unique lattice spacing which is different and distinguishable from those of compounds hitherto known. Resulting patterns or traces are characteristic of this new protein complex.

Bacteriological tests prove the excellent bacteriological condition of the new product. The average counts are relatively low. In no instance was there any mold present and the bacterial count averaged about 76,000 bacteria per gm. This count is considerably less than the normal bacteriological count of certified milk. Most health department ordinances call for milk to contain 100,000 or less bacteria per gm.

It is possible to sterilize the product of my invention so that the product is virtually free from bacteria or mold or in other ways is practically sterile. This can be done without deleterious effect upon the properties of the material or without voiding the suggested uses of the material, according to the type of process described in U. S. Patent No. 2,107,697, of which the author is one of the patentees, and, copending applications on the sterilization of food and pharmaceutical materials.

Although the present invention has been described in connection with the details of specific examples embodying the same, it is not intended that these details shall be regarded as limitations on the scope of the invention, except insofar as included in the accompanying claims.

I claim:

1. The method of making a protein composition which comprises mixing an aqueous dispersion of milk protein at a pH not over 6 with an aqueous suspension of animal blood hemoglobin at a pH of not over 6 to obtain an aqueous dispersion of the mixed solids, and dewatering the mixture to a dry solid form, whereby the dry product contains a chemically new protein complex.

2. The method of making a protein composition which comprises mixing an aqueous dispersion of milk casein at a pH not over 6 with an aqueous suspension of animal blood hemoglobin at a pH of not over 6 to obtain an aqueous dispersion of the mixed solids, and dewatering the mixture to a dry solid form, whereby the dry product contains a chemically new protein complex.

3. The method of making a protein composition which comprises mixing an aqueous dispersion of milk lactalbumen at a pH not over 6 with an aqueous suspension of animal blood hemoglobin at a pH of not over 6 to obtain an aqueous dispersion of the mixed solids, and dewatering the mixture to a dry solid form, whereby the dry product contains a chemically new protein complex.

4. The method of making a protein composition which comprises mixing an aqueous dispersion of animal skim milk solids at a pH of not over 6 with an aqueous dispersion of animal blood hemoglobin at a pH of not over 6 to obtain an aqueous dispersion of the mixed solids, and dewatering the mixture to a dry solid form, whereby the dry product contains a chemically new protein complex.

5. The method of making a protein composition which comprises mixing an aqueous dispersion of animal skim milk solids at a pH of not over 6 with an aqueous dispersion of fresh animal blood at a pH of not over 6, to obtain an aqueous dispersion of the mixed solids, and dewatering the mixture to a dry solid form, whereby the dry product contains a chemically new protein complex.

6. The method of making a protein composition which comprises mixing an aqueous dispersion of animal skim milk solids at a pH of not over 6 with an aqueous dispersion of defibrinated animal blood at a pH of not over 6 to obtain an aqueous dispersion of the mixed solids, and dewatering the mixture to a dry solid form, whereby the dry product contains a chemically new protein complex.

7. The method of making a protein composition which comprises mixing an aqueous dispersion of animal milk protein at a pH in the range from 5.4 to 6.0 with an aqueous dispersion of animal blood hemoglobin at a pH in the range from 5.4 to 6.0, and dewatering the mixture to a dry solid form, whereby the dry product contains a chemically new protein complex.

8. The method of making a protein composition which comprises mixing an aqueous dispersion of animal milk casein at a pH in the range from 5.4 to 6.0 with an aqueous dispersion of animal blood hemoglobin at a pH in the range from 5.4 to 6.0, and dewatering the mixture to a dry solid form, whereby the dry product contains a chemically new protein complex.

9. The method of making a protein composition which comprises mixing an aqueous dispersion of animal milk lactalbumen at a pH in the range from 5.4 to 6.0 with an aqueous dispersion of animal blood hemoglobin at a pH in the range from 5.4 to 6.0, and dewatering the mixture to a dry solid form, whereby the dry product contains a chemically new protein complex.

10. The method of making a protein composition which comprises separately adjusting with the same added acid an aqueous dispersion of animal milk protein and an aqueous dispersion of animal blood hemoglobin to a pH not over 6 and over a value which will cause precipitation of protein on mixing the adjusted dispersions, mixing the adjusted dispersions, and dewatering the mixture to a dry solid form, whereby the dry product contains a chemically new protein complex.

11. The method of making a protein composition which comprises separately adjusting with the same added acid an aqueous dispersion of animal milk protein and an aqueous dispersion of animal hemoglobin to a pH from 5.4 to 6, mixing the adjusted dispersions, and dewatering the mixture to a dry solid form, whereby the dry product contains a chemically new protein complex.

12. The method of making a protein composition which comprises mixing an aqueous dispersion of animal milk protein at a pH in the range from 5.4 to 5.7 with an aqueous dispersion of animal blood hemoglobin at a pH in the range from 5.4 to 5.7, and dewatering the mixture to a dry solid form, whereby the dry product contains a chemically new protein complex.

13. The method of making a protein composition which comprises mixing an aqueous dispersion of animal milk casein at a pH in the range from 5.4 to 5.7 with an aqueous dispersion of animal blood hemoglobin at a pH in the range from 5.4 to 5.7, and dewatering the mixture to a dry solid form, whereby the dry product contains a chemically new protein complex.

14. The method of making a protein composition which comprises mixing an aqueous dispersion of animal milk lactalbumen at a pH in the range from 5.4 to 5.7 with an aqueous dispersion of animal blood hemoglobin at a pH in the range from 5.4 to 5.7, and dewatering the mixture to a dry solid form, whereby the dry product contains a chemically new protein complex.

15. The method of making a protein composition which comprises concentrating an aqueous dispersion of animal skim milk to from 20% to 50% of suspended milk solids, mixing said concentrated milk at a pH of not over 6 with a suspension of animal blood hemoglobin at a pH of not over 6 to provide a suspension of the total proteins of the milk and the hemoglobin, and dewatering the mixture to provide a dry solid product containing a new protein complex.

16. A new protein combining protein of animal milk and animal hemoglobin, the combination being chemical, whereby said new protein exhibits an X-ray diffraction pattern not exhibited by the said component proteins.

17. A new protein combining the protein of animal casein and animal hemoglobin, the combination being chemical, whereby said new protein exhibits an X-ray diffraction pattern not exhibited by the said component proteins.

18. A new protein combining the lactalbumen of animal milk and animal hemoglobin, the combination being chemical, whereby said new protein exhibits an X-ray diffraction pattern not exhibited by the said component proteins.

19. A composition of matter comprising the total solids of animal skim milk and animal blood hemoglobin, and containing as a chemical compound a reaction producting of the milk protein and hemoglobin.

20. A composition of matter comprising the total solids of animal skim milk and the total solids of animal blood, and containing as a chemical compound a reaction product of milk protein and blood hemoglobin.

21. A composition of matter comprising the total solids of animal milk whey and animal hemoglobin, and containing as a chemical compound a reaction product of protein of said whey and hemoglobin.

22. A composition of matter comprising the total solids of animal milk whey and animal blood, and containing as a chemical compound a reaction product of protein of said whey and blood.

23. The method of making a protein composition which comprises mixing an aqueous dispersion of animal milk whey at a pH of not over 6 and an aqueous dispersion of animal blood hemoglobin at a pH of not over 6, and dewatering the mixture to provide a solid powder containing a chemical union of milk protein and hemoglobin.

LLOYD A. HALL.